United States Patent
Kulas

(10) Patent No.: US 8,123,614 B2
(45) Date of Patent: Feb. 28, 2012

(54) GAMEPIECE CONTROLLER USING A MOVABLE POSITION-SENSING DISPLAY DEVICE INCLUDING A MOVEMENT CURRENCY MODE OF MOVEMENT

(76) Inventor: Charles J. Kulas, San Francisco, CA (US)

( * ) Notice: Subject to any disclaimer, the term of this patent is extended or adjusted under 35 U.S.C. 154(b) by 213 days.

(21) Appl. No.: 12/759,445

(22) Filed: Apr. 13, 2010

(65) Prior Publication Data

US 2011/0250964 A1     Oct. 13, 2011

(51) Int. Cl.
*A63F 13/12*     (2006.01)
(52) U.S. Cl. ............................. 463/31; 463/37; 345/156
(58) Field of Classification Search ............ 463/30–34, 463/37
See application file for complete search history.

(56) References Cited

U.S. PATENT DOCUMENTS

| | | | |
|---|---|---|---|
| 5,714,972 A * | 2/1998 | Tanaka et al. ................. | 345/156 |
| 6,200,219 B1 * | 3/2001 | Rudell et al. .................... | 463/37 |
| 6,411,275 B1 | 6/2002 | Hedberg | |
| 6,466,198 B1 * | 10/2002 | Feinstein ....................... | 345/158 |
| 6,573,883 B1 | 6/2003 | Bartlett | |
| 6,614,420 B1 * | 9/2003 | Han et al. ...................... | 345/161 |
| 6,798,429 B2 | 9/2004 | Bradski | |
| 7,142,191 B2 | 11/2006 | Idesawa et al. | |
| 7,223,173 B2 * | 5/2007 | Masuyama et al. ............. | 463/36 |
| 7,454,715 B2 * | 11/2008 | Chen et al. .................... | 715/850 |
| 2003/0001863 A1 * | 1/2003 | Davidson et al. ............. | 345/619 |
| 2004/0125073 A1 * | 7/2004 | Potter et al. ................... | 345/156 |
| 2004/0129783 A1 | 7/2004 | Patel | |
| 2004/0219978 A1 * | 11/2004 | Teramoto et al. ............... | 463/32 |
| 2006/0094502 A1 * | 5/2006 | Katayama et al. .............. | 463/31 |
| 2006/0164382 A1 * | 7/2006 | Kulas et al. .................... | 345/156 |
| 2006/0223637 A1 * | 10/2006 | Rosenberg ...................... | 463/47 |
| 2007/0106483 A1 | 5/2007 | Kelley et al. | |
| 2009/0103810 A1 * | 4/2009 | Echigo et al. ................. | 382/190 |
| 2010/0013768 A1 * | 1/2010 | Leung ............................ | 345/163 |
| 2010/0131947 A1 * | 5/2010 | Ackley et al. .................... | 718/1 |
| 2010/0279768 A1 * | 11/2010 | Huang et al. ................... | 463/31 |

OTHER PUBLICATIONS

Don't Dial It, Jiggle It; CNN.com; Feb. 3, 2005, 3 pages.

* cited by examiner

*Primary Examiner* — Dmitry Suhol
*Assistant Examiner* — Jason Yen

(57) ABSTRACT

Embodiments of the invention provide a method and apparatus for moving a gamepiece in an electronic game where gamepieces are moved by user movement of devices. For example, cell phones may be used to control gamepiece movement on a table top or other surface. Each user moves their respective cell phone to control the movement of their gamepiece. Other user controls can be used to provide additional interaction. One embodiment discloses a tank game where each user operates a tank that is used to shoot at other user gamepieces in real time as the users move about a table top surface. Details are provided of two specific types of movement, but other types of movement are possible.

9 Claims, 5 Drawing Sheets

GAMEPIECE CONTROLLER USING A MOVABLE POSITION-SENSING DISPLAY DEVICE INCLUDING A MOVEMENT CURRENCY MODE OF MOVEMENT

BACKGROUND

Embodiments of the invention relate generally to electronic games and more specifically to using a portable device such as a cell phone to control gamepieces.

Electronic games are a popular form of entertainment. As technology progresses, the electronic devices on which the games are played (i.e., "platforms") have become smaller. Devices such as cell phones, ultra-mobile personal computers (UMPC), personal digital assistants (PDAs), tablet or slate computers, sub-notebooks, music players, cameras, video recorders, web browsers, or other hand-held or easily movable devices often have very small or limited displays, user input controls, or other components so that designing entertaining games for the movable devices can be challenging.

SUMMARY

Embodiments of the invention provide a method and apparatus for moving a gamepiece in an electronic game where gamepieces are moved by user movement of devices. For example, cell phones may be used to control gamepiece movement on a table top or other surface. Each user moves their respective cell phone to control the movement of their gamepiece. Other user controls can be used to provide additional interaction. One embodiment discloses a tank game where each user operates a tank that is used to shoot at other user gamepieces in real time as the users move about a table top surface. Details are provided of two specific types of movement, but other types of movement are possible.

A "movement currency" type of movement allows a user to move their gamepiece at any desired speed and direction as long as a counter or value that represents movement currency is above a predetermined threshold. As the user moves the device the movement currency depletes. Once the movement currency value falls below a certain level then adverse effects may occur to the user's gamepiece, movement or other aspects of the game.

A "selection box" type of movement allows a user to move the device in a direction and speed that the user wishes the gamepiece to move. If the device is moved faster than the gamepiece is allowed by game constraints then a gamepiece icon on the display screen of the device is shown to lag behind the movement. Other details of both the movement currency, selection box, and other types of movement approaches are disclosed.

One embodiment describes a method for controlling an electronic game, wherein first and second devices are in communication, wherein the first device is movable by a human hand and includes a display, position sensor, user input control and transceiver, the method comprising: detecting movement of the first device parallel to a horizontal surface; accepting a signal from the user input control; determining a current position of the first device relative to the second device at the time of accepting the signal; using the current position, movement and signal to cause an action in a game that is displayed on the first device; and sending signals via the transceiver to one or more other devices being moved by one or more other users in the game, wherein the signals are responsive to the user input control and the device movement to affect gameplay.

Another embodiment discloses a method for controlling movement of a gamepiece in an electronic game, the method comprising: determining that a device is being moved across a horizontal surface, wherein the device includes a display, user input control, transceiver, and digital processor, wherein the device is slid or moved in response to force applied by one or more human hands of a user; displaying a gamepiece icon on the display; sending signals via the transceiver to one or more other devices being moved by one or more other users in the game, wherein the signals are responsive to the user input control and the device movement to affect gameplay; defining a threshold speed of movement in a predetermined direction for the gamepiece in a game, wherein the gamepiece is controlled by the device; detecting when the device is being moved in the predetermined direction at a particular speed, wherein the particular speed is greater than the threshold speed, and in response to the detecting: decreasing a value of a movement measure associated with the gamepiece; and encumbering an attribute of the gamepiece in the game when it is determined that the movement measure value has decreased past a predetermined value.

Another embodiment discloses a method for controlling movement of a gamepiece in an electronic game, the method comprising: determining that a device is being moved across a horizontal surface, wherein the device includes a display, user input control, transceiver, and digital processor, wherein the device is slid in response to force applied by one or more human hands of a user; displaying a gamepiece icon on the display; sending signals via the transceiver to one or more other devices being moved by one or more other users in the game, wherein the signals are responsive to the user input control and the device movement to affect gameplay; defining a threshold speed of movement in a predetermined direction for the gamepiece in a game, wherein the gamepiece is controlled by the device; detecting when the device is being moved in the predetermined direction at a particular speed, wherein the particular speed is greater than the threshold speed, and in response to the detecting: preventing the gamepiece icon from moving in the predetermined direction at the particular speed so that the gamepiece icon changes position on the display to lag behind the device movement.

DETAILED DESCRIPTION OF EMBODIMENTS

Figure 1:
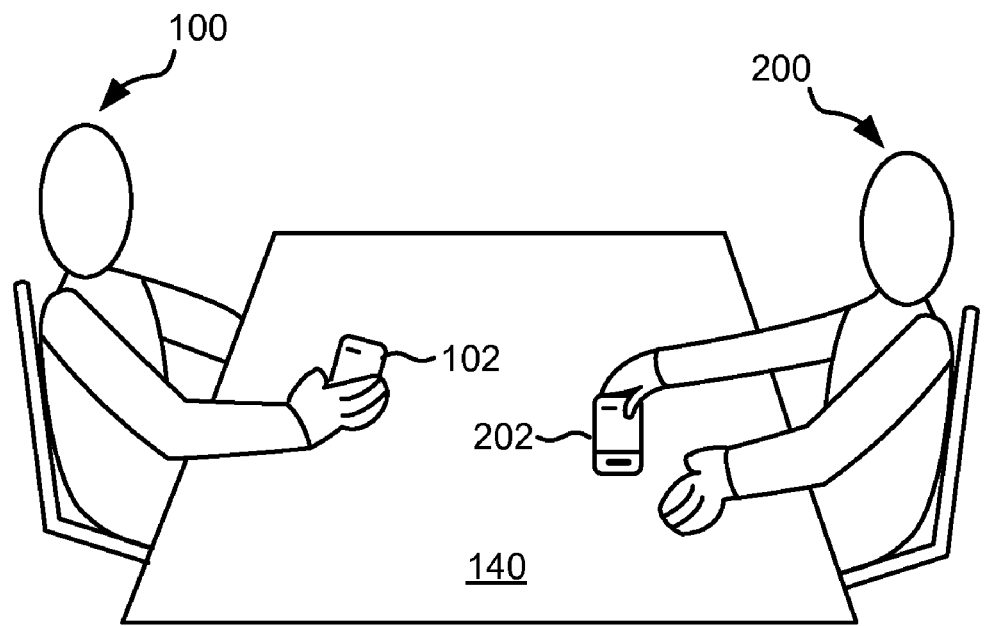
FIG. 1 illustrates two players using two movable devices to play a game on a horizontal surface.

In FIG. 1, first player 100 and second player 200 playing a game using movable devices according to an embodiment of the invention. Player 1 operates device 102 while player 2 operates device 202. Each player can use one or both hands to operate their respective device. The devices are slid over or moved about on a horizontal surface such as table 140. Although the primary examples are for tabletop play it should be apparent that play on other surfaces, such as vertical, angled, rough or uneven surfaces, etc. may also be suitable. In some embodiments no surface may be needed as gameplay can take place by holding the devices in the air. Combinations of such playing surfaces and styles are possible. Players need not be seated and can be in different positions or orientations with each other. Solitaire play is possible as is play with more than two players. In other embodiments, manipulation of the devices can be by other body parts rather than hands, fingers and arms. "Sliding" or "movement" is intended to include any movement such as movement in contact with a surface, rolling, floating, etc., or simply moving through free air unless otherwise indicated.

Figure 2:
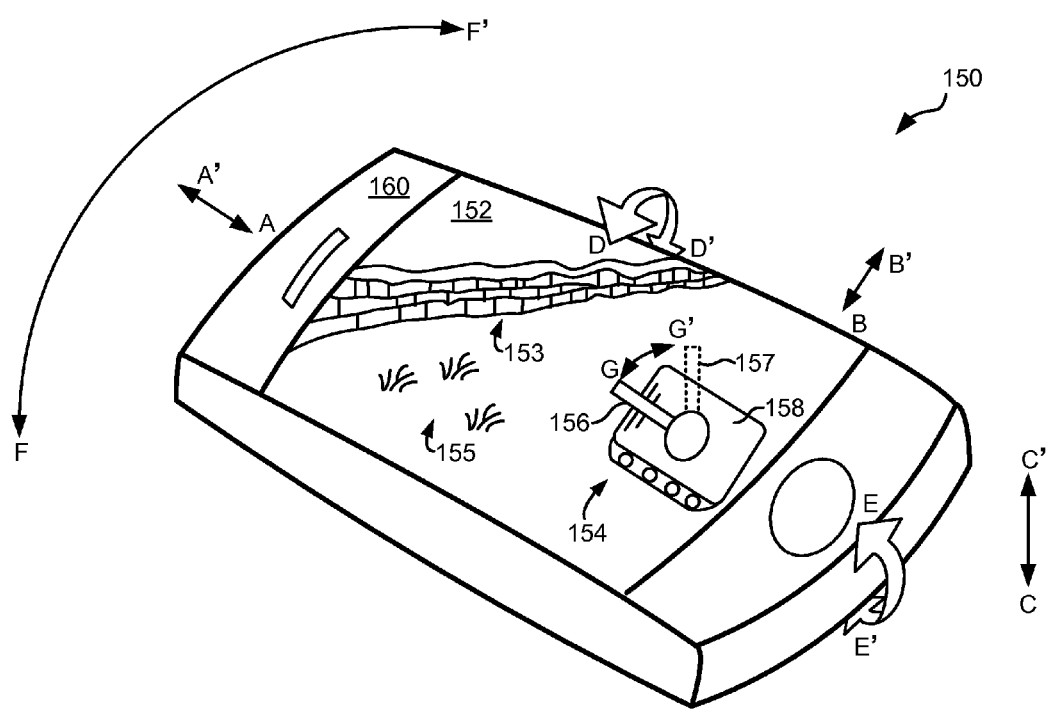
FIG. 2 shows a top view example of a movable device that is suitable for use with embodiments of the invention.

FIG. 2 illustrates a top view example of a movable device that is suitable for use with embodiments of the invention. In FIG. 2, device 150 includes display 152, top 160 and user input control 158. As is known in the art, such types of devices can be cell phones, tablet computers, Personal Digital Assistants (PDAs), Ultra-Mobile Personal Computers (UMPCs), tablet or slate computers, dedicated handheld video game devices, cameras, video recorders, music players, etc. Display 152 is equipped with a touch screen so that one or more user contacts can be sensed for additional input. Although embodiments of the invention are primarily described with respect to specific user tactile controls, in general any suitable type of user input controls can be used. For example, on-screen controls such as sliders, buttons, dials, etc., can be used. Or physical controls can be provided. Non-tactile use input such as voice commands, gesture detection, image recognition, etc., can be used to obtain, accept or generate a signal in response to a user action.

In FIG. 2, device 150 (which is an example of a movable device such as 102 and 202 of FIG. 1) may be translationally moved across a surface, such as tabletop 140 of FIG. 1, in a forward direction A-A'. Also, movement in a sideways direction B-B' is possible. It should be apparent that A-A' and B-B' are normal geometric components and that movements using any amount or degree of the forward or sideways directions are possible so that the device can be slid across the surface in any direction two-dimensional direction. However, a particular embodiment of the invention includes certain restrictions and handling of movement dependent upon the amount of forward or sideways motion, as described in more detail, below. In other embodiments, translational movement can also include movement in the third component C-C' in addition to or in place of other motion components.

Device 150 may also be rotated in the direction F-F'. Tilting of the device is possible in the directions D-D' and E-E'. A particular embodiment is primarily concerned with movement in the A-A', B-B' and F-F' directions for gameplay on a flat horizontal surface such as a tabletop. However, any other type or combination of movements in one or more directions can be used in gameplay. Directions referenced as, for example, A-A' are intended to include the reverse direction A'-A unless otherwise stated. Directions referenced with an arrow such as A→A' are intended to refer only to the indicated direction starting from A and moving toward A'.

For example, one type of game can be a "tank battle" game where each player controls a tank gamepiece 154. Each tank has a turret such as tank turret 156 that can swivel about a pivot point with respect to tank chassis 158. In the tank battle game, forward movement of the chassis is permissible up to certain maximum speeds. However, substantial sideways movement is not possible or can be penalized as explained below. As movable device 150 is slid about the tabletop, the game terrain features scroll across display 152 accordingly. In FIG. 2, for example, terrain features such as grass 155 and wall 153 are shown. If the user continues a movement in the direction A→A' the tank, which remains fixed on the screen, will encounter and eventually impact wall 153 which will scroll toward the tank in the direction A'→A. In a particular embodiment, the terrain scrolling is attempted to be mapped 1:1 to movement of the device across the playing surface. This provides intuitive feedback and gameplay to the user. In this 1:1 mapping of terrain to playing surface, the playing surface can be thought of as "painted" or sculpted onto the playing surface and the device's display screen acts as a "window" onto the playing surface. In other embodiments, the movement of the terrain may be faster or slower than the actual device movement, as desired.

Thus, the tank, including turret and chassis, can be moved about on the playing surface by the user's movement of the device. The tank chassis remains oriented facing the front of the device. The tank turret can be rotated or swiveled by the user touching the touch-sensitive display or a different control such as a keyboard, a pointing device, etc. For example, the user can use an index finger and thumb and make a rotating movement on the display screen. The turret rotates in the direction and to the degree of the user's finger rotation. Other ways of controlling turret rotation are possible and can be within the scope of the claimed invention.

For purposes of this specification, a gamepiece can include any visual depiction of an object, icon, token or other item used in a game. Although particular embodiments are described with respect to "games" it should be apparent that other applications are possible. For example, features described herein may be adapted for use in educational, commercial, research, recreational or other types of electronic applications.

Movement of the device within a predetermined plane of movement (e.g., a horizontal plane of a tabletop) may cause the effects of movement of the digital game piece (or any one or more game pieces, avatars, etc.) through a virtual environment. Movement of the device out of the plane may cause different effects. For example, in the tank game example, the tilting of the device out of the plane of gamepiece translational movement may cause the cannon of the controlled piece to modify the range, power or other properties of the projectiles it launches.

Within the display screen of the device a portion, or all, of the playfield may be revealed. As the device moves away from the plane it may change the view of the surface of the playfield which is revealed. One method for changing the view is to reduce the scale at which the playfield and the icons contained within it are rendered. Thus, as the device is moved further from the plane, the proportion of the playfield visible to the player is increased. This increase in the size of the visible area may be in proportion to the distance between the device and the surface or according to another function or set of functions. The size of the icons may be changed as the scale shifts providing the user the experience that the portable device's display screen is a window onto a consistently sized virtual world which the user may see from different perspectives depending how far away from the plane the device is positioned and the angle or orientation of the positioning. if the device is held above the plane and moved parallel to the plane, but at a distance from the plane, the view of the visible play surface changes with the scale remaining constant. Note that movement parallel to a plane includes movement above, below, on or in the plane, such as on or along a tabletop; floating on a surface of, or within, a liquid; etc.

Figure 5A:
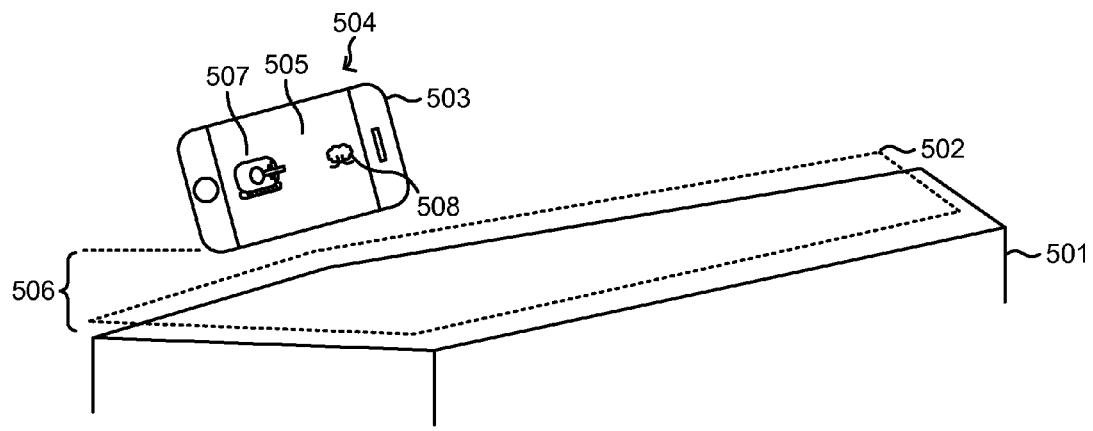
FIG. 5A shows a first illustration of a view at a first scale.
Figure 5B:
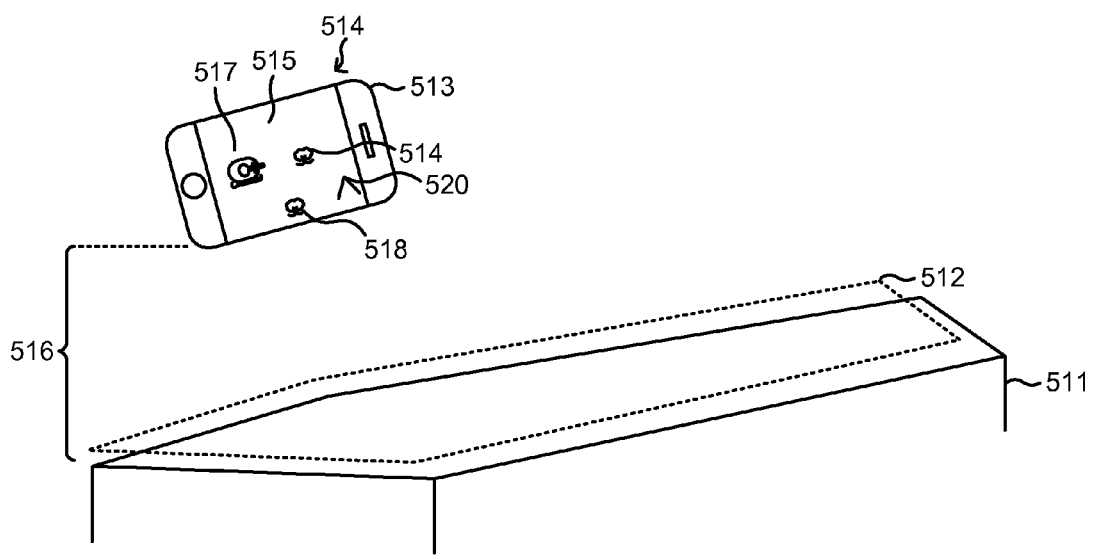
FIG. 5B shows a second illustration of a view at a second scale.

FIGS. 5A and 5B show virtual and physical playfield concepts and also illustrate tilt, or perspective views. In FIG. 5A, playfield 502 overlays physical surface 501. In other words, the terrain of the gameplay can be thought of as sitting on top of the tabletop 501. Handheld device 503 is positioned above the surface at distance 506. On display 504, playfield view 505 is represented at a first scale (5A) displaying player avatar 507 and terrain element 508.

In FIG. 5B, device 513 is at distance 516 above playfield 512 over surface 511 and displays playfield view 515 on display 54 at a second scale (5B) showing player avatar 517 and terrain elements 518, 519 and 520. In the example show the relationship between the near scale shown in FIG. 5A and the farther scale shown in FIG. 5B is associated with the relative distances 506 and 516 from the surface. The near scale shows less virtual playfield area but larger icons or shapes having more detail. The farther scale shows more of the virtual playfield area but uses smaller icons or shapes having less detail.

Although embodiments of the invention are described with respect to specific examples of gamepieces such as tanks or armored vehicles, many other types of gamepiece designs may be used. These include cars, trucks, ships, spaceships, airplanes, motorcycles, tricycles, other motorized vehicles as well as robots, suits of battle armor, carts, carriages, horses, ponies, mules, bats, birds, wolves and other animals. In addition the play piece may represent an avatar such as a wizard, witch, warrior, rogue, orc, elf, goblin, giant, troll, dwarf or other such fantastical or mythological creature, alien, cyborg, traveler, soldier, gladiator, pirate or other avatar.

Many different gameplay pieces and terrain elements may be used. They may be displayed on the display of the portable device or they may exist within the game software but not be visible depending on where the player positions the portable device.

Different icons may be placed at different locations on the display and may take up different proportions of the display real estate. The scale changes of the playfield and the icons need not be the same. Thus as the device moves away from the play surface, terrain elements may change in size while the players gamepiece may stay at a consistent scale. Different elements or classes of elements may change scale at similar or dissimilar rates. One class of elements may increase in scale as the device moves away from the plane while another class of elements decreases in scale.

As the scale changes, the amount of information supplied to the player regarding each gamepiece or terrain element may change. For example, when the device is close to the play surface the view of the gamepiece can change from its location within the overall play surface in association with other gamepieces and terrain elements to a detailed examination of the gamepiece in particular and the relationship of various gameplay elements and currencies controlled by the player. This examination can be aided by displaying text boxes with descriptive information. As the device moves closer to the plane more text can appear to fill the screen, and/or the icon of a gamepiece may expand to fill the entire display and then transform into a diagram representing the internal systems and elements of the play piece, such as internal components of a tank—engine, ammunition, armor, etc. Details of the components may be indicated such as the integrity or state of repair of the component by using colors—green for fully repaired, yellow for damaged or low on amount, red for inoperative or out of amount (e.g., ammunition).

The user interface may shift as the device is moved closer to, or further from, the plane. Thus, while the device is further from the plane, movement of the device may indicate movement of the gamepiece through space while if the device is close to, or on or in the plane, movement of the device may indicate changes in allocation of currencies to gamepiece systems.

The device can use a predetermined signal to change the mode of interaction with the gamepieces. For example, if the device is within the plane, the movement of the gamepiece may be according to the below described 'Movement Currency' model, while if the device is lifted above the playfield plane, the movement of the gamepiece may be according to the below described 'Selection Box' model. One such predetermined signal to change the mode of interaction can be movement of the device away from or into the playfield plane. Other predetermined signals can include key presses, touch screen interaction, accelerometer events or audible commands.

Movement Currency

Figure 3:
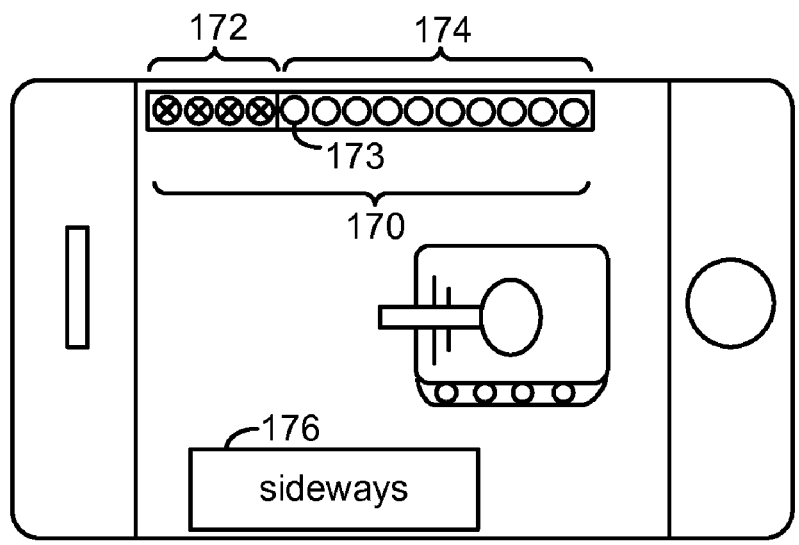
FIG. 3 illustrates details of a "movement currency" mode of gamepiece motion control according to embodiments of the invention.

FIG. 3 illustrates details of a "movement currency" mode of gamepiece motion control according to particular embodiments of the invention. In FIG. 3, energy indicator 170 includes a bar or meter illustration that shows how much currency, or "energy," the player's tank's engine currently possesses. The more movement currency the engine has, the more the player is able to move the tank (by sliding the movable device) in a forward traverse, slowly moving and turning traverse, or rotating in place without any adverse effects. Such motion is analogous to "spending" the movement currency. As currency, or energy, accumulates, the energy indicator increases to the right into region 174. As energy increases, the indicator lights up progressively from left to right. A zero indication is when no lights are on. A first light 173 is lit when energy starts to build. During gameplay, energy builds over time. Successive lights to the right of light 173 are progressively lit as energy accumulates. For example, it may take 5 seconds for energy to build to a maximum to light all 10 lights at a rate of 0.5 seconds per light, assuming the tank is motionless so that no energy is being consumed. As energy is used up by movement of the device, energy is subtracted. This subtraction can cause the energy accumulation to slow down, stop and reverse. If the energy accumulation goes negative into region 172, the negative light indicators are progressively turned on.

Negative or adverse actions can occur if the player attempts to move the tank forward too quickly, move in too much of a sideways motion component, or perform other motion actions that are restricted by gameplay. If energy accumulation is too negative, or is negative for too long a time, the player's tank can be immobilized, take on damage, be destroyed, etc., thereby causing the player to be restricted in movement or other gameplay, and possibly to lose the game. In different embodiments, other indicators can be used in addition to energy indicator 174 to show improper movement or gameplay. For example, sideways warning indicator 176 is displayed if sideways or lateral movement exceeds a predetermined threshold. In general, other types of indicators besides or in addition to the ones shown in the present Figures, such as FIG. 3, are possible. A number or set of numbers can be used. In general, an indicator can include any type of physical effect such as an animation, use of color, lighting or intensity changes, sound, physical vibration of the device, etc.

The rate of change of the energy currency and the degree to which it changes over time or responds to forward motion, lateral motion or rotation may differ for different play pieces. One play piece may increase in energy quickly, yet lose energy rapidly for forward motion, while another play piece may gain energy very slowly, yet pay little or no energy cost for rotation. Player actions or external events may transform the state of the game such that different rates of currency increase or depletion occur as the game progresses. For example, if one play piece is considered to be damaged, it may generate less energy or pay a higher cost to rotate.

The rate of expenditure of the energy currency may be modified based upon the terrain elements encountered. As the play piece moves horizontally through the virtual playfield, it may encounter myriad terrain elements such as fences, rivers, walls or hills. As the play piece navigates these obstacles the rate of depletion of the energy currency may shift. In some cases, such as the interaction with roads, bridges, magnetic pads or rails the rate of energy depletion may decrease for a given displacement or acceleration.

Energy currency may be depleted through movement of the hand held device such that depletion of the currency is proportional to the distance moved along an axis or such that the depletion of a currency is proportional to the acceleration in a direction or proportional to the total distance moved along multiple axes or the total acceleration along multiple axes. Currencies may be depleted through movement of the device along an axis in a pattern that has a non-linear yet monotonically positive relationship with the displacement along an axis or the acceleration along an axis. Currencies may be depleted based on functions that combine measurement of a combination of one or more of displacement, velocity, acceleration or the higher level derivatives of displacement such as the rate of jerk/jolt/surge/lurch or jounce/snap. The depletion of the currency may vary in other ways depending upon game design.

An alternative embodiment uses a turn-based movement currency. Instead of accumulating movement currency over time, a player receives movement currency at the beginning of a turn. Once movement currency is used for a gamepiece then that gamepiece may not be moved again until more currency is accumulated at the player's next turn. Typically, each other player would also have turns that are taken in an order until the player's turn comes up again. Another alternative is to have one or more players' currencies replenish at fixed turn intervals such as every 15 seconds. This allows players to perform their movements at the same time while still providing a type of turn-based movement allocation. Other ways to allocate, award or replenish movement currency are possible.

Depletion of the movement currency may result in reduction or depletion or accumulation of other types of currency. For example, a given playing piece may have a certain quantity of armor, shields or hit points which, upon depletion of the movement currency are then depleted. When the movement currency is depleted then further movement or attempted use of the movement currency can cause a reduction in an energy currency. The generation of the movement currency may depend on the existence of a threshold level of another currency, such as an energy currency. Other types of currencies are possible. A playing piece may accumulate a damage currency or an overload currency upon depletion of one of its other currencies such as movement or energy. A primary currency such as a, movement or energy currency does not need not be completely depleted for these other, secondary, currencies to change in value. Changes in the energy currency, or changes in the rate at which the energy currency is depleted may result in modifications of the alternate currencies. For example, if a movement or energy currency depletion rate exceeds a certain threshold, some of the damage currency may be accumulated or some of the armor, shields or hit points may be depleted.

Players may make active decisions which affect the parameters which effect the rate at which the movement currency is depleted based on movement of the device. In one embodiment, the play piece on the screen may transform from one mode to another, both a graphical alteration of the icon representing the play piece and an alteration of the parameters which relate the movement of the device and the rate of change of the energy currency. For example, a given play piece may be represented by a tank and have one set of relationships between movement, terrain types and the energy currency, but it may transform into a boat and have a separate set of parameters which control the rate of change of the energy currency and its movement. Some play piece modes may have, for example, extremely high energy regeneration but pay a very high cost for all movement, others may allow for rapid forward movement but increase the cost for rotations while others may permit rapid rotation, yet increase the cost for forward acceleration or place a restrictive threshold over the maximum forward velocity.

Selection Box Movement

An alternative movement approach is referred to as a "selection box" type of movement control. In the selection box movement mode, the movable device's display window acts as a selection box which can lead or "suggest" a direction or action for the gamepiece. With the selection box approach, the game software attempts to move the gamepiece in the direction of, or in accordance with, the movement of the device. However, due to limitations imposed on the gamepiece by the game mechanics (e.g., it is not possible to move a tank in sideways translational movement) the gamepiece position may not follow, or may only partially follow, the movement of the device. Alternatively, movement in non-preferred directions may be possible, but this non-preferred movement may be made slower, more costly or otherwise less advantageous for the player.

Figure 4:
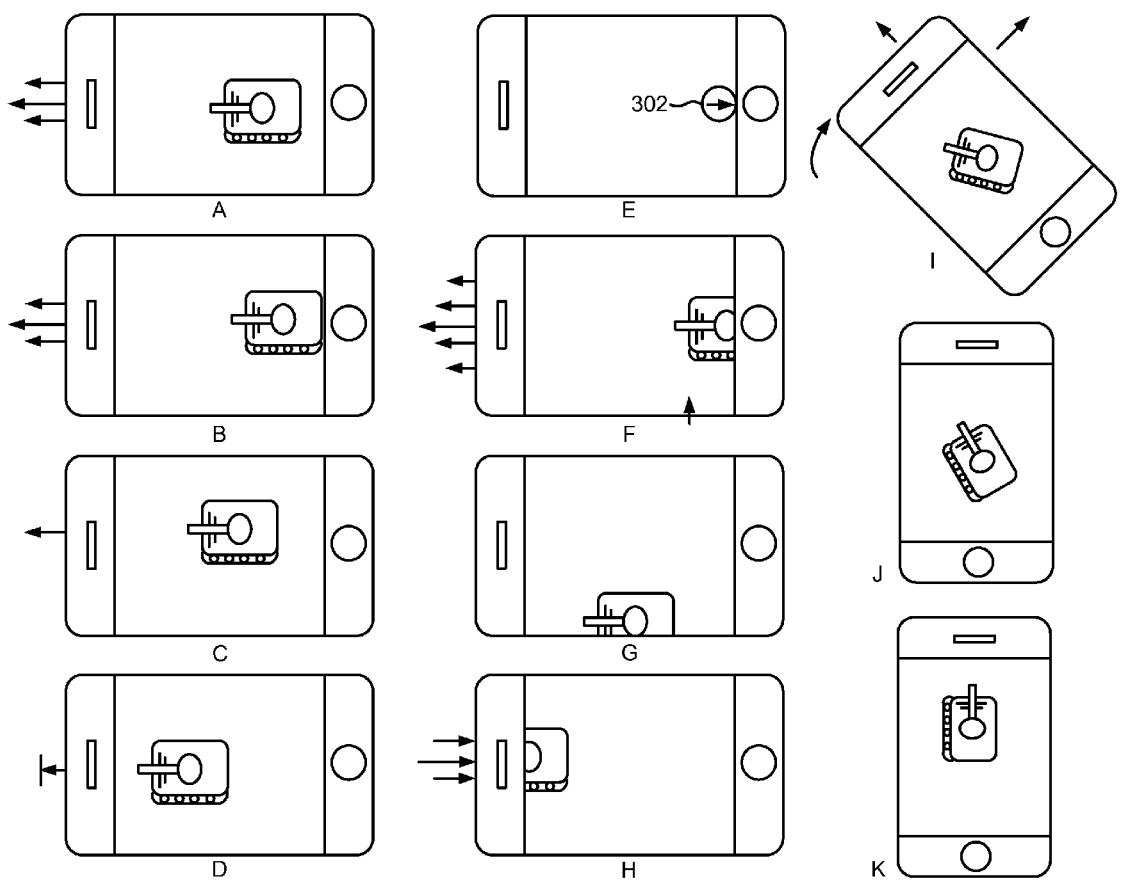
FIG. 4 illustrates details of a "selection box" mode of gamepiece motion control according to embodiments of the invention.

FIG. 4 illustrates embodiments of gamepiece motion control using selection box movement. Display A shows movable device 200 with gamepiece 202 at about the center of the display and facing to the left. The device is being accelerated in the left direction as shown by the arrows. Display B shows that the gamepiece is left behind and has drifted to the right of the display area. This effect represents some "inertia" or delay in acceleration of the gamepiece. The relative amount of acceleration of the gamepiece with respect to the device can vary according to desired game behavior.

Display C shows that the device is now being moved to the left with constant velocity (i.e., no acceleration/deceleration). The gamepiece has caught up with the device's movement and is back at about the center of the display area. Display D shows that the device is being decelerated by the user and is brought to a stop. The gamepiece takes more time to slow down and drifts to the left of the display area as the tank comes to a stop.

Also shown in FIG. 4 are other effects of selection box movement. In display F the device is moved very quickly to the left. This movement is faster than is allowed by the game mechanics for the gamepiece so the gamepiece drifts off the screen to the right while it is attempting to maintain its default position at the center of the display area.

When sustained acceleration is faster than the gamepiece's acceleration then the gamepiece may fall behind and be completely off-screen. In such a case a marker such as marker 302 appears with an arrow at the edge of the display to indicate the general direction of the off-screen gamepiece. This allows the user to slide the device back towards the gamepiece in order to recover a view of the gamepiece.

Display G of FIG. 4 illustrates the gamepiece moving off the bottom part of the display due to movement of the device sideways in an upward motion as shown by the arrow. Display H shows the gamepiece moving off to the left of the display due to a fast stop, deceleration or reversing of direction to the right as shown by the arrows.

Display I shows clockwise rotation of the device and the resulting lagging rotation of the gamepiece as it also begins moving in a clockwise direction to match the device's rotation. Depending upon gameplay, the gamepiece rotation can have different speeds or degrees of lag. Or the rotation may be instantaneous (i.e., little or no lag between device and gamepiece rotation). Display J shows that the device rotation has stopped so that the device is oriented at 90 degrees from its original position while the gamepiece is still rotating to approach 90 degrees. Figure K shows the gamepiece rotation ended so that the gamepiece and the device are now oriented in the same rotation. Note that the displays in FIG. 4 are sample illustrations of types of movement and gamepiece display. Other types of movement directions are possible besides or in addition to those illustrated in FIG. 4. In particular embodiments, the details of gamepiece movement interaction with device movement can depend upon the specific game.

Multiple gamepieces can be controlled. The selection box movement approach can provide for a user "selecting" one particular gamepiece by moving the display to show the gamepiece and then activating a control. For example, when a gamepiece is on the display the user can tap the display to select the gamepiece for any form of movement control described herein.

Hybrid Movement

Various of the features of "movement currency" and "selection box" types of movement control can be combined to create a hybrid movement interface. A user may select between the two types of movement control by activating a predetermined control. Or the type of movement control, either movement currency or selection box movement, may be forced upon the user automatically by the game software and/or hardware and can change between the two according to the rules of gameplay. The switching among, or combining of, movement currency and selection box modes of movement can be implemented in various ways. For example, a combination of movement currency and selection box approaches can be used so that selection box movement also results in depletion of a movement currency that can result in any of the effects described herein for movement currency (e.g., depletion of armor, damage taken, reduction of fuel or other attributes, etc.). Other variations are possible.

Hardware for Position Sensing and Processing

Any suitable type of technology can be used to detect the displacement of a portable electronic device along an axis. For example, gameplay features according to embodiments of the invention can be implemented with any suitable form of displacement or movement detection or through combinations of such technologies or through other methods not listed here which provide the same or similar information to the device such that the gameplay effects may be implemented. Technologies which may be used to detect such displacement include accelerometers with one or more axes, gyroscopes, global positioning satellite signals, interpolation of location through triangulation by WiFi signal or other electromagnetic signals, image recognition from a camera either on the device or an external camera, or scene panning using a camera on the device. The use of the device's own camera to detect displacement is possible much in the same manner as an optical mouse or other optical detector. Types of device sensors used in the detection of displacement include antennas, RF Frequency detectors, Wireless LAN, GSM, CDMA, Bluetooth, GPS, RFID, Inertial Sensing, Accelerometers, Electric Compass's, Gyroscopes, Optical Mice and Cameras.

System Communications and Processing

Figure 6:
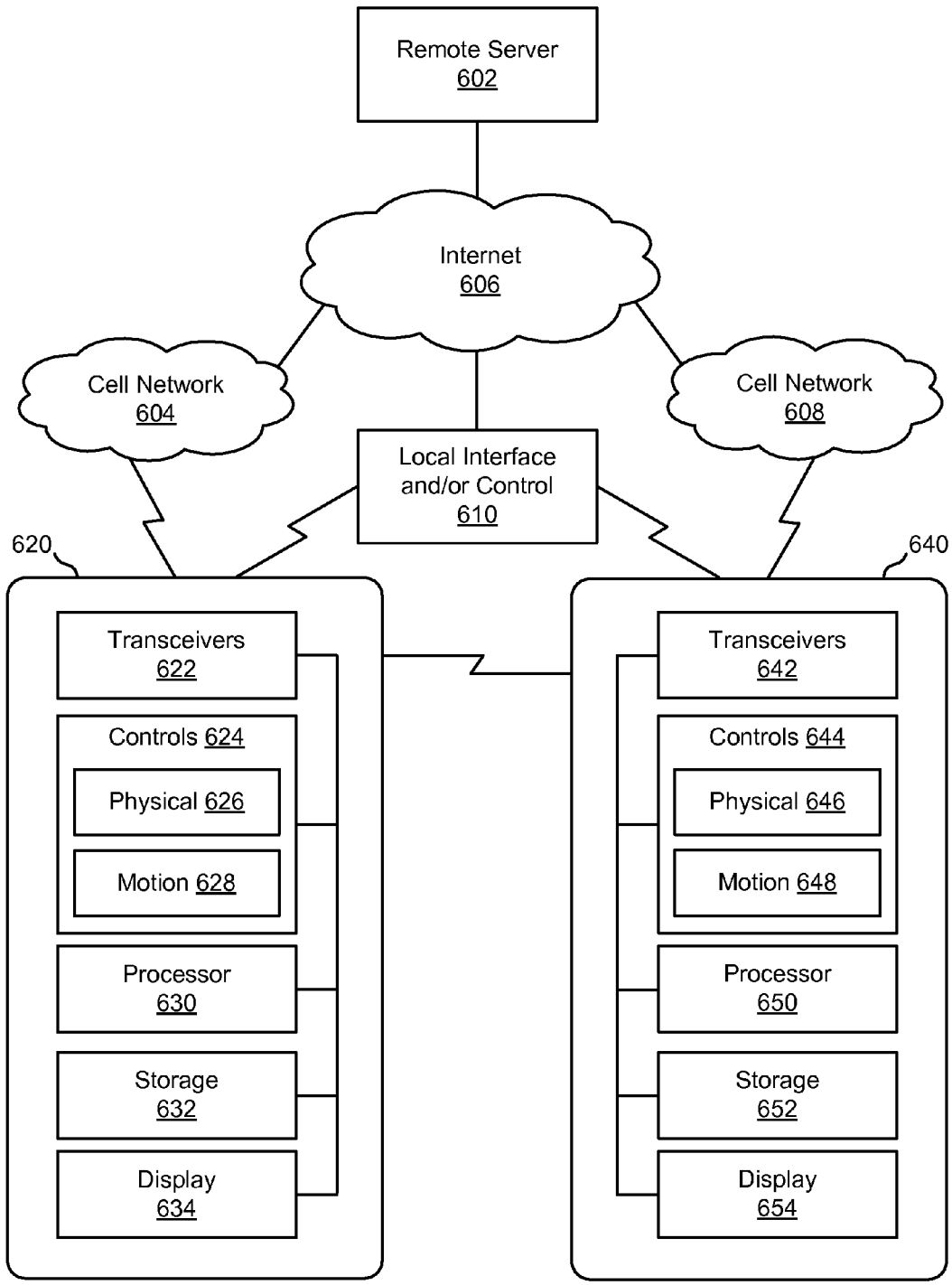
FIG. 6 illustrates basic hardware devices and other items that may be used with embodiments of the invention.

FIG. 6 illustrates basic hardware devices and components that may be used with embodiments of the invention. It should be apparent that the selection and arrangement of devices, subsystems and components in FIG. 6 is but one example of basic items that may be used. Other approaches may use any suitable number or type of items so long as the processing and communication functions can be implemented.

In FIG. 6, movable devices 620 and 640 are used to play a game or other application that uses device movement detection and processing according to the description herein. The devices each include similar functionality although devices with different or varying functionality may also be used. For example, device 620 includes subsystems such as transceivers 622 and controls 624. Controls 624 includes both physical user controls 626 (e.g., buttons, sliders, joystick, touch screen, etc.) and motion controls (e.g., accelerometers, inertial sensors, position sensors, camera or image sensing, etc.) that can detect movement of the device relative to another object. Processor 630 is in communication with the various subsystems. Also included in device 620 are storage 632 (e.g., random-access memory (RAM), flash memory or other solid state memory, hard drive or other magnetic media, optical media, or any other suitable storage) and display 634. As is known in the art, storage 632 can include instructions that are executable by the processor, data to be processed or that has been processed, or other types of electronic information.

Although specific interconnections are shown for device 620, these interconnections are merely a basic illustration of a system where the processor is in communication with the other subsystems. Any suitable form of intercommunication may be used. In general, the communication from one device, component, network, or other entity to another can be by any means now know or discovered in the future. For example, hardwired, wireless, optical, radio or light frequency or other electromagnetic signal, etc. may be used for the communications described herein unless otherwise noted.

Device 640 as shown in FIG. 6 has similar functionality to device 620 and includes the same subsystems numbered 642-654.

In device 620, transceivers 622 allow the device to communicate with external devices. For example, device 620 can use Bluetooth™, WiFi, wireless Ethernet, or other wireless standards to communicate with device 640. Wired modes of communication may also be used such as Universal Synchronous Bus (USB), Ethernet, serial or parallel cable communication, optical cable, etc. In one embodiment, the devices may implement the some or all of the functionality described herein without relying on any other external devices. In such a device-to-device implementation, one or both of the devices would be performing the controller or server functions that are not device-specific. For example, one device can be executing a process to determine whether one device's projectile hits the other.

Another embodiment uses a local interface or control 610. Such an interface can be a router, switch, wireless access point, or other device with communication ability and processing ability. A combination of devices such as a server or other standalone computer coupled to a wireless transceiver can be used for local control 610. Local control 610 receives signals from both device 620 and device 640 and can either transfer the signals to one or the other of the devices directly (for processing by that device) or can process the signals itself and send the results of such processing to the devices. In this example, local controller 610 could determine whether one device's projectile hits the other. Other functionality can be included in local control 610 such as keeping track of scores, arranging games between two or more players, etc.

Yet another embodiment allows the movable devices to communicate with larger, more generalized, remote networks such as a cellular network (via interfaces 604 and 608) and/or a global network such as Internet 606. In such cases, a separate computer can be used, such as server 602, to provide the controller game functions. The separate computer controls or manages the gameplay by receiving position and action signals from the movable device controls 624 and 644; and provides responses as to the outcome of movement and action, such as whether and to what extent a player's gamepiece has been damaged, obstructed, etc.

Note that any suitable type and number of processing devices can be interconnected by communication links in order to achieve features of the invention as described herein. The diagram of FIG. 6 is merely one simplified example to illustrate possible configurations of hardware and software in devices and subsystems.

Although embodiments of the invention has been described with respect to particular embodiments thereof, these particular embodiments are merely illustrative, and not restrictive. For example, other types of movement may be susceptible to detection and processing or other features of the claimed invention. Movement can include any type of translation or rotation in free space. Abrupt or unusual movement such as jiggling, slamming, twisting, etc. can be detected and have specific results within a game. Predefined patterns can be used, etc.

Larger devices that may be considered not easily movable with a human hand may be used. For example, tablet or slate computers such as the iPad™ by Apple Computer, Inc. can be used even though these devices are significantly larger than cell phones. In different embodiments, the larger devices can be moved more slowly or can be used as stationary graphics on the gaming surface (e.g., a tabletop) so that instead of moving they provide an interactive stationary part of the game by showing terrain, an obstacle, a turret or fortress, scores or other shared information, etc. Other uses are possible.

Discussion of movement or movement sensing can include any sensing or measurement of position, velocity or acceleration unless otherwise noted. It is well-known that movement parameters including current position or position changes may be determined or derived by measurements of later position or other movement parameters such as velocity or acceleration.

Any suitable programming language can be used to implement the routines of particular embodiments including C, C++, Java, assembly language, etc. Different programming techniques can be employed such as procedural or object oriented, scripts, interpreted or compiled code, etc. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

The invention claimed is:

1. A method for controlling movement of a gamepiece in an electronic game, the method comprising:
    determining that a device is being moved across a horizontal surface, wherein the device includes a display, user input control, transceiver, and digital processor, wherein the device is moved in response to force applied by one or more human hands of a user;
    displaying a gamepiece icon on the display;
    sending signals via the transceiver to one or more other devices being moved by one or more other users in the game, wherein the signals are responsive to the user input control and the device movement to affect gameplay;
    defining a threshold speed of movement in a predetermined direction for the gamepiece icon in a game, wherein the gamepiece icon is controlled by the device;
    detecting when the device is being moved in the predetermined direction at a particular speed, wherein the particular speed is greater than the threshold speed, and in response to the detecting:
    preventing the gamepiece icon from moving in the predetermined direction at the particular speed so that the gamepiece icon changes position on the display to lag behind the device movement.

2. The method of claim 1, wherein when the gamepiece icon lags behind the device movement it moves off the display.

3. The method of claim 2, further comprising:
    displaying a marker to indicate the direction of the gamepiece that has moved off the display.

4. The method of claim 3, wherein the marker includes an arrow.

5. The method of claim 1, further comprising:
when the device is slowed down in movement the gamepiece icon that lags behind the device movement is moved back to an original position on the display.

6. The method of claim 1, further comprising:
determining when one of multiple gamepieces has been selected by detecting a user activation of a control when a gamepiece is viewable on the display.

7. The method of claim 6, wherein the user activation of a control includes tapping the display.

8. An apparatus for controlling movement of a gamepiece in an electronic game, the apparatus comprising:
a device including a display, user input control, transceiver, and digital processor,
the device further including a processor-readable storage device having one or more instructions executable by the digital processor for:
determining that the device is being moved across a horizontal surface wherein the device is moved in response to force applied by one or more human hands of a user;
displaying a gamepiece icon on the display;
sending signals via the transceiver to one or more other devices being moved by one or more other users in the game, wherein the signals are responsive to the user input control and the device movement to affect gameplay;
defining a threshold speed of movement in a predetermined direction for the gamepiece icon in a game, wherein the gamepiece icon is controlled by the device;
detecting when the device is being moved in the predetermined direction at a particular speed, wherein the particular speed is greater than the threshold speed, and in response to the detecting:
preventing the gamepiece icon from moving in the predetermined direction at the particular speed so that the gamepiece icon changes position on the display to lag behind the device movement.

9. A processor-readable storage device including one or more instructions executable by a digital processor for:
determining that a device is being moved across a horizontal surface wherein the device is moved in response to force applied by one or more human hands of a user;
displaying a gamepiece icon on a display;
sending signals via a transceiver to one or more other devices being moved by one or more other users in the game, wherein the signals are responsive to the user input control and the device movement to affect gameplay;
defining a threshold speed of movement in a predetermined direction for the gamepiece icon in a game, wherein the gamepiece icon is controlled by the device;
detecting when the device is being moved in the predetermined direction at a particular speed, wherein the particular speed is greater than the threshold speed, and in response to the detecting:
preventing the gamepiece icon from moving in the predetermined direction at the particular speed so that the gamepiece icon changes position on the display to lag behind the device movement.

* * * * *

UNITED STATES PATENT AND TRADEMARK OFFICE
CERTIFICATE OF CORRECTION

| | | |
|---|---|---|
| PATENT NO. | : 8,123,614 B2 | Page 1 of 1 |
| APPLICATION NO. | : 12/759445 | |
| DATED | : February 28, 2012 | |
| INVENTOR(S) | : Kulas | |

It is certified that error appears in the above-identified patent and that said Letters Patent is hereby corrected as shown below:

Item (54) & Col. 1 line 1-5, Title should read: GAMEPIECE CONTROLLER USING A MOVABLE POSITION-SENSING DISPLAY DEVICE INCLUDING A SELECTION BOX MODE OF MOVEMENT Signed and Sealed this
Eighth Day of May, 2012

David J. Kappos
*Director of the United States Patent and Trademark Office*